(12) United States Patent
Seidl (10) Patent No.: US 11,043,866 B2
(45) Date of Patent: Jun. 22, 2021

(54) ELECTRIC MACHINE HAVING AN IMPROVED COOLING ROTOR SHAFT

(71) Applicant: Magna Powertrain GmbH & Co KG, Lannach (AT)

(72) Inventor: Gerhard Seidl, Felixdorf (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 24 days.

(21) Appl. No.: 16/301,518

(22) PCT Filed: Apr. 6, 2017

(86) PCT No.: PCT/EP2017/058272
§ 371 (c)(1),
(2) Date: Nov. 14, 2018

(87) PCT Pub. No.: WO2017/198389
PCT Pub. Date: Nov. 23, 2017

(65) Prior Publication Data
US 2019/0312475 A1 Oct. 10, 2019

(30) Foreign Application Priority Data
May 20, 2016 (DE) .................. 10 2016 208 770.3

(51) Int. Cl.
*H02K 1/32* (2006.01)
*H02K 1/30* (2006.01)
(Continued)

(52) U.S. Cl.
CPC ............... *H02K 1/32* (2013.01); *H02K 1/26* (2013.01); *H02K 1/30* (2013.01); *H02K 9/19* (2013.01); *H02K 17/16* (2013.01); *H02K 17/165* (2013.01)

(58) Field of Classification Search
CPC .. H02K 1/32; H02K 1/26; H02K 1/30; H02K 9/19; H02K 9/193; H02K 9/197; H02K 17/16; H02K 17/165
(Continued)

(56) References Cited

U.S. PATENT DOCUMENTS

| 3,629,628 A | * | 12/1971 | Rank | ............... B60L 3/0061 |
| | | | | 310/54 |
| 2003/0015935 A1 | * | 1/2003 | Berger | ............... H02K 7/116 |
| | | | | 310/216.053 |

(Continued)

FOREIGN PATENT DOCUMENTS

| CN | 1249558 A | 4/2000 |
| CN | 102714438 A | 10/2012 |

(Continued)

OTHER PUBLICATIONS

Machine translation of DE-102013020324-A1. (Year: 2014).*

(Continued)

*Primary Examiner* — Michael Andrews
(74) *Attorney, Agent, or Firm* — Dickinson Wright PLLC (57) ABSTRACT

The invention relates to an electric machine comprising a stator and a rotor. The rotor is rotatably mounted within the stator and has a rotor shaft which is in the form of a hollow shaft and by means of which a cavity is formed that is provided for receiving a coolant. The rotor shaft has at least two shoulders, and at least one end section, wherein at least three rotor shaft sections with different diameters are formed. A flow element is arranged in the cavity of the rotor shaft in the region of the second rotor shaft section, and at least one radial outlet opening is formed in the casing of the rotor shaft in the region of the second rotor shaft section, said outlet opening fluidically connecting the cavity of the rotor shaft to an outer region of the rotor shaft.

16 Claims, 8 Drawing Sheets

(51) Int. Cl.
*H02K 17/16* (2006.01)
*H02K 1/26* (2006.01)
*H02K 9/19* (2006.01)

(58) Field of Classification Search
USPC .......................................... 310/61, 400–417
See application file for complete search history.

(56) References Cited

U.S. PATENT DOCUMENTS

2003/0030333 A1 2/2003 Johnsen
2003/0146667 A1 8/2003 Hattori et al.

FOREIGN PATENT DOCUMENTS

| DE | 102009029716 | A1 | | 12/2009 | |
|---|---|---|---|---|---|
| DE | 112010004773 | T5 | | 10/2012 | |
| DE | 102012220239 | A1 | * | 5/2014 | ............... H02K 9/08 |
| DE | 102012220239 | A1 | | 5/2014 | |
| DE | 102013020324 | A1 | * | 7/2014 | ............... H02K 1/32 |
| DE | 102013020324 | A1 | | 7/2014 | |
| DE | 102013020331 | A1 | | 7/2014 | |
| DE | 102013020332 | A1 | | 7/2014 | |
| DE | 102014018223 | A1 | | 6/2015 | |
| DE | 102014205884 | A1 | | 10/2015 | |
| DE | 102014107845 | A1 | | 12/2015 | |
| JP | 2005006429 | A | | 1/2005 | |

OTHER PUBLICATIONS

Machine translation of DE-102012220239-A1. (Year: 2014).*
International Search Report and Written Opinion dated Dec. 6, 2017 from corresponding International Patent Application No. PCT/EP2017/058272 with English translation of International Search Report.
Search Report dated Apr. 28, 2017 from corresponding German Patent Application No. 102016208770.3.

* cited by examiner

ELECTRIC MACHINE HAVING AN IMPROVED COOLING ROTOR SHAFT

CROSS-REFERENCE TO RELATED APPLICATIONS

This application is a National Stage of International Application No. PCT/EP2017/058272, filed Apr. 6, 2017, which claims the benefit and priority to German Patent Application No. DE 10 2016 208 770.3 filed May 20, 2016. The entire disclosures of each of the above applications are incorporated herein by reference.

FIELD OF THE INVENTION

The present invention relates to an electrical machine comprising a stator and a rotor, wherein the rotor is rotatably mounted within the stator and has a rotor shaft which is designed as a hollow shaft and by means of which a hollow space is formed, said hollow space being provided for receiving a cooling medium, wherein the rotor shaft has at least two projections at at least one end section.

BACKGROUND OF THE INVENTION

This section provides information related to the present disclosure which is not necessarily prior art.

Electrical machines comprise a stationary stator and a moving rotor, wherein the rotor, in the most common design of an electrical machine, is rotatably mounted within a stator of annular design. The stator of an electrical machine has a stator core and at least one stator winding which is arranged on the stator core. The stator winding is arranged on the stator core in slots which are provided for this purpose. The end windings of the stator windings are formed at both end faces of the stator, more precisely of the stator core. The rotor of an electrical machine which is designed as an asynchronous machine comprises a rotor core, a rotor cage and also a rotor shaft. The rotor cage comprises a plurality of conductor bars which are embedded in slots on the outer circumference of the rotor core. The conductor bars project beyond the end faces of the rotor core and are electrically connected at the respective end face by means of a short-circuiting ring in each case.

Electrical machines, asynchronous machines and synchronous machines, generate heat on account of the dielectric loss during operation of said machines. Excessive development of heat occurs predominantly in the region of the stator winding, in particular in the region of the respective end winding, and/or in the region of the short-circuiting ring of the rotor of the electrical machine in the case of asynchronous machines. The result of this excessive heating is an increase in the dielectric loss factor—even more electrical energy is converted into heat, this firstly having an adverse effect on the degree of efficiency of the electrical machine and secondly having a negative influence on reliable operation of the electrical machine over the service life of said electrical machine. Therefore, a cooling apparatus is generally provided in electrical machines, which cooling apparatus cools, in particular, the points in the rotor and/or the stator which are subjected to a severe thermal load, specifically the end windings at the end faces of the stator and/or of the rotor and the short-circuiting rings at the end faces of the rotor in the case of asynchronous machines.

Conventional cooling arrangements for electrical machines employ a circulating gaseous or liquid cooling medium. The cooling medium circulates, for example, in a housing of the electrical machine or in a rotor shaft which is designed as a hollow shaft and on which the rotor core of the electrical machine is arranged. On account of its thermal capacity, the cooling medium absorbs the heat and transports said heat away. These solutions are generally performed at a great distance from the regions of the stator and/or of the rotor which are subjected to severe thermal loading, such as the end windings of the stator winding of the stator and/or the short-circuiting rings of the rotor cage of the rotor for example.

In addition, cooling apparatuses which cool surfaces of an electrical machine, which surfaces are to be cooled, by virtue of evaporating a cooling medium are also known. In this case, the cooling medium is evaporated at the surface to be cooled and then recondensed again. In this case, the cooling medium is generally sprayed directly onto those surfaces of the stator and/or of the rotor which are to be cooled. However, this cooling apparatus concept usually does not involve cooling of the rotor shaft of the rotor. If rotor shaft cooling is realized within a concept of this kind, a second cooling circuit is required in order to be able to meet the various requirements.

Furthermore, flooded electrical machines are known, which provide the option of allowing at least a portion of the end winding of the stator winding of the stator and/or the short-circuiting rings of the rotor cage of the rotor to be immersed in a cooling medium. In this case, the rotation of the electrical machine causes the cooling medium to be partially transported and atomized within the housing of the electrical machine. However, uniform cooling cannot be guaranteed by means of this cooling apparatus design.

Document DE 10 2013 020 332 A1 describes, for example, an electrical machine, in particular an asynchronous machine, comprising a stator and a rotor which can rotate about a rotation axis relative to the stator and comprises a rotor shaft. The rotor shaft has a first channel which extends axially over at least one length region. The channel is designed such that a cooling medium can flow through it. The first channel at least partially receives at least one line element which extends at least in a subregion of the first channel. The line element has a second channel which extends in the axial direction and through which cooling medium can flow. The rotor shaft, in its lateral surface which delimits the first channel, has at least one outlet opening for conducting cooling medium out of the first channel to the area surrounding the rotor shaft. The first channel and the second channel are fluidically connected to one another by means of an axial passage opening in the line element. The jet of cooling medium from the rotor shaft directly strikes the short-circuiting ring of the rotor via the outlet opening—cooling of the short-circuiting ring of the rotor and also of the rotor shaft of the rotor is realized by means of the cooling apparatus of the electrical machine, which cooling apparatus is described in this document.

SUMMARY OF THE INVENTION

This section provides a general summary of the disclosure, and is not a comprehensive disclosure of its full scope or all of its features.

The object of the invention is to specify an alternative electrical machine which is distinguished by improved cooling.

The object is achieved by an electrical machine comprising a stator and a rotor, wherein the rotor is rotatably mounted within the stator and has a rotor shaft which is designed as a hollow shaft and by means of which a hollow space is formed, said hollow space being provided for receiving a cooling medium, wherein the rotor shaft has at least two projections at at least one end section, wherein, in this way, at least three rotor shaft sections, specifically a first rotor shaft section, a second rotor shaft section and a third rotor shaft section, with different diameters are formed, wherein a flow element is arranged in the hollow space in the rotor shaft in the region of the second rotor shaft section, and wherein at least one radial outlet opening is formed in the region of the second rotor shaft section in the casing of the rotor shaft, said radial outlet opening fluidically connecting the hollow space in the rotor shaft to an outer region of the rotor shaft.

The electrical machine according to the invention comprises a stator and a rotor with a rotor shaft.

According to the invention, the rotor of the electrical machine is rotatably mounted within the stator.

According to the present invention, the rotor shaft is designed as a hollow shaft and forms a hollow space in this way. The hollow space serves to receive and guide a cooling medium.

According to the invention, the rotor shaft has at least two projections at at least one end section. According to the present invention, three rotor shaft sections, specifically a first rotor shaft section, a second rotor shaft section and a third rotor shaft section, with different diameters are formed by the two projections.

According to the present invention, a flow element is arranged in the hollow space in the rotor shaft in the region of the second rotor shaft section. Furthermore, according to the invention, at least one radial outlet opening is formed in the region of the second rotor shaft section in the casing of the rotor shaft. The radial outlet opening serves to fluidically connect the hollow space in the rotor shaft to an outer region of the rotor shaft.

The term "radial" corresponds to a direction normal to a longitudinal axis of the electrical machine.

The term "axial" corresponds to a direction along or parallel to the longitudinal axis of the electrical machine.

Owing to the design according to the invention of the electrical machine, the cooling medium which is guided through the hollow space in the rotor shaft can be guided in a targeted manner in a simple way and such that the electrical machine, in particular the rotor, is particularly efficiently cooled. This results in reliable operation of the electrical machine over its service life.

Owing to the design of the rotor shaft and the arrangement of the flow element and the radial outlet opening in the region of the second rotor shaft section, it is possible to ensure targeted cooling of rotors even in pressureless systems, that is to say a system in which system pressure does not prevail in the hollow space in the rotor shaft.

Cooling of the rotor of the electrical machine is realized in a particularly simple way, this being reflected firstly in a low level of expenditure on assembly and secondly in low production costs.

Developments of the invention are specified in the dependent claims, the description and the appended drawings.

In one advantageous variant embodiment of the present invention, the flow element is formed in a sleeve-like manner and has a central first opening and at least one second opening which is formed in the casing of the flow element. The flow element is preferably arranged in the hollow space in the rotor shaft such that the hollow space in the rotor shaft is fluidically connected to the radial outlet opening in the casing of the rotor shaft and therefore to the outer region of the rotor shaft via the second opening in the flow element.

The cooling medium can therefore enter the radial outlet opening through the second opening in the casing of the flow element.

The sleeve-like flow element preferably has a narrow point, wherein the second opening in the flow element is formed in the region of the narrow point of the flow element.

The flow element is manufactured, for example, from plastic. It is likewise conceivable to manufacture the flow element from another material, such as from a composite material for example, or from a metal material, such as steel for example.

The flow element can be produced, for example, by thermoforming/deep-drawing or pressing in appropriate dies.

The electrical machine preferably has an attachment element. The attachment element of the electrical machine is preferably arranged on the rotor shaft in the region of the end section of the rotor shaft in such a way that cooling medium which passes out of the hollow space in the rotor shaft via the outlet opening can be routed at least partially over a rotor end face and a stator end face.

The above-described arrangement of the attachment element on the rotor shaft allows for targeted guiding of cooling medium over the rotor end face and over the stator end face of the electrical machine.

Therefore, not only the rotor, but also the stator, can be at least partially cooled.

The attachment element can either be fastened to the rotor shaft as a separate component or can be integrally formed with a component of the electrical machine, such as integrally formed with a short-circuiting ring of the rotor in the case of an asynchronous machine for example.

If the attachment element is optionally integrally formed with the short-circuiting ring of a rotor of an asynchronous machine, in addition to the targeted guiding of cooling medium over the rotor end face, more precisely over the short-circuiting ring, and over the stator end face, more precisely over the end windings, said attachment element can also make a contribution to reinforcing the short-circuiting ring of the rotor and effectively counteracts the centrifugal force, in particular at high rotation speeds, as a result of which plastic deformation of the short-circuiting ring can be prevented.

The attachment element is particularly preferably formed in a substantially circular manner with a central third opening and a plurality of radially running tracks and/or channels which are at a uniform distance from one another.

The design of a central third opening enables simple positioning and fastening of the attachment element on/to the rotor shaft. Furthermore, owing to the design of radially running tracks and/or channels, the cooling medium is guided in a targeted manner over the end surface of the rotor and of the stator.

The attachment element is preferably formed with a substantially step-like cross section along a normal plane on the longitudinal axis of the electrical machine, wherein a cooling medium collecting section is formed in the region of the radial outlet opening in such a way.

Owing to the attachment element being formed in a step-like manner, a cooling medium collecting section which collects cooling medium passing out of the radial outlet opening is formed in a simple manner. Therefore, the cooling medium can be guided in a particularly efficient manner over the stator end face, in particular the end windings of the stator.

The attachment element is preferably manufactured from plastic. It is likewise conceivable to configure the attachment element from another material, such as, composite material for example, or from a metal material, such as steel for example.

Owing to the attachment element being formed from plastic, production of the attachment element can be realized in a simple manner. Furthermore, forming the attachment element from plastic has a positive influence on the weight of the electrical machine.

Forming the attachment element from a solid material, such as steel for example, a composite material etc. can further have a positive effect on the strength, for example, of the short-circuiting ring of the rotor of an asynchronous machine.

DRAWINGS

The drawings described herein are for illustrative purposes only of selected embodiments and not all possible implementations, and are not intended to limit the scope of the present disclosure.

The invention will be described below by way of example with reference to the drawings.

DETAILED DESCRIPTION OF THE INVENTION

Figure 1:
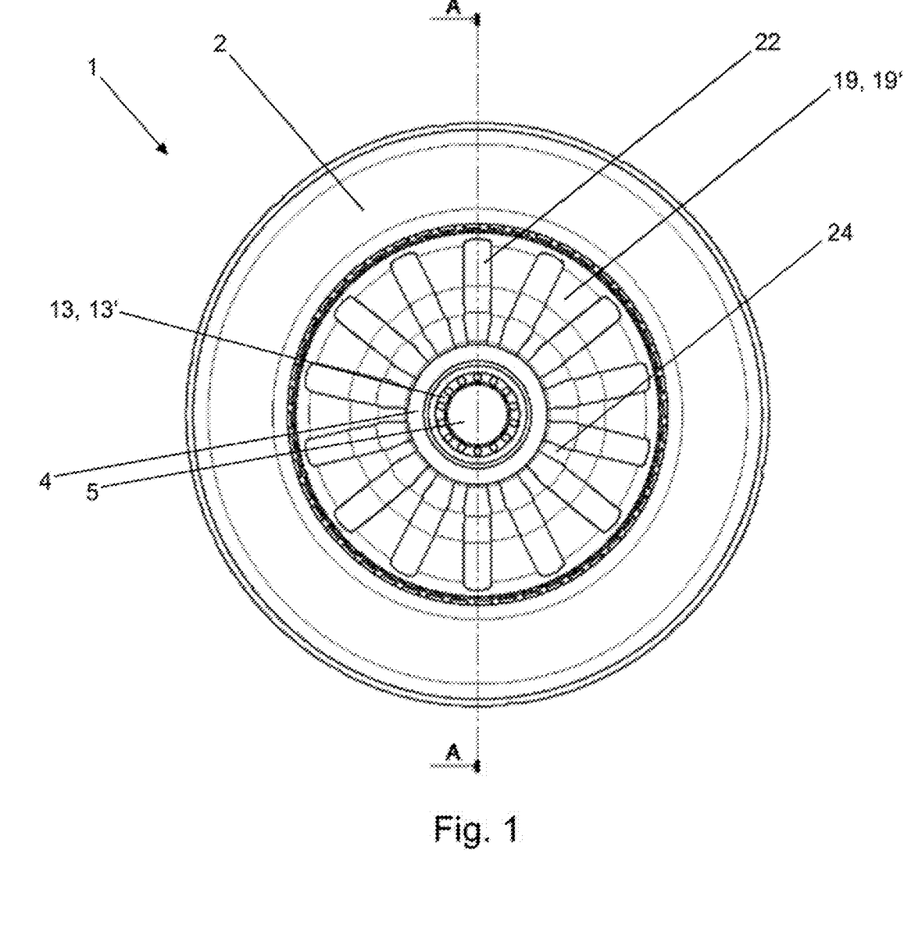
FIG. 1 shows a plan view of an end face of an electrical machine according to the invention.
Figure 2:
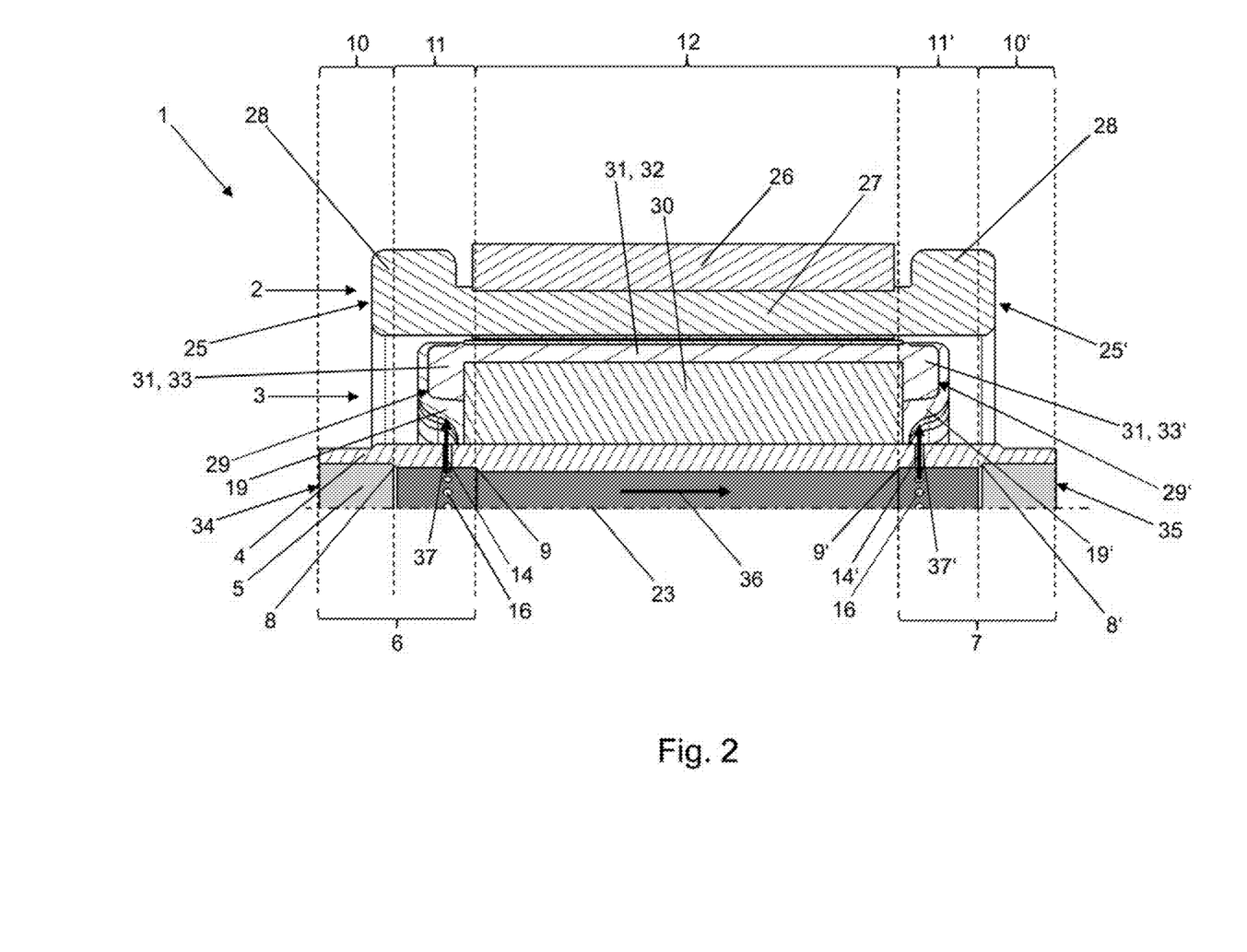
FIG. 2 shows a sectional view of an electrical machine according to the invention along a sectional plane A-A in accordance with FIG. 1 on a longitudinal axis.
Figure 3:
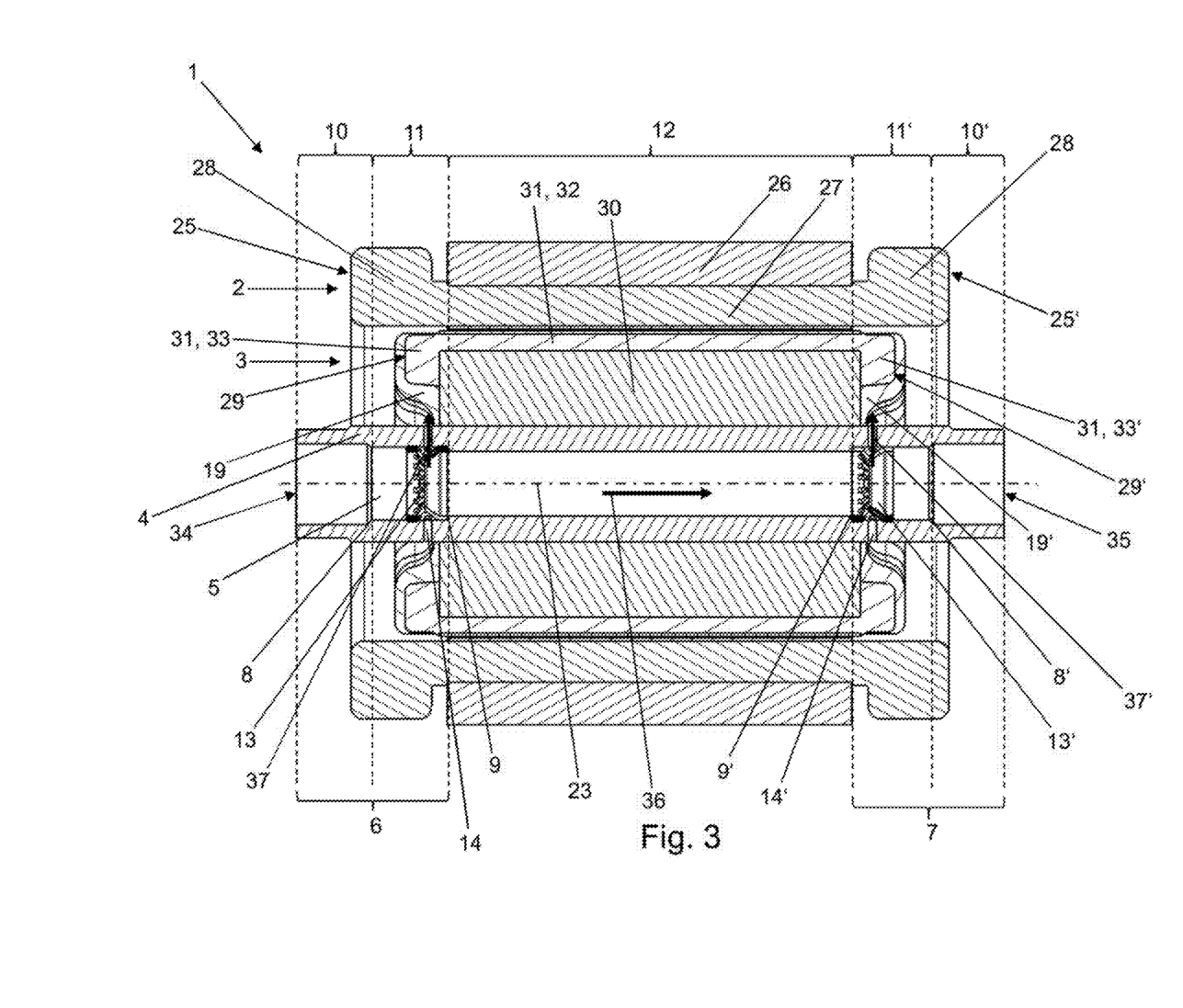
FIG. 3 shows a further sectional view of an electrical machine according to the invention along a sectional plane A-A in accordance with FIG. 1.
Figure 5:
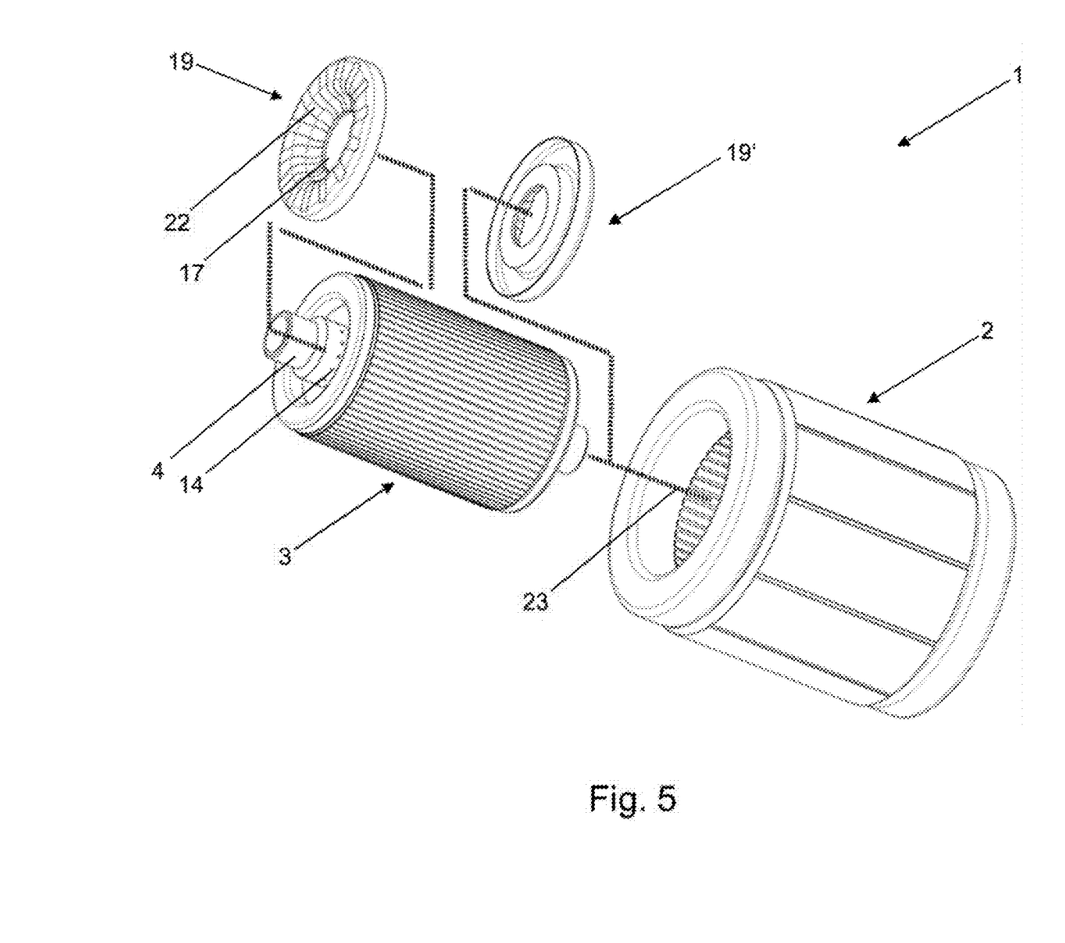
FIG. 5 shows an exploded illustration of an electrical machine according to the invention in accordance with FIG. 1.
Figure 7:
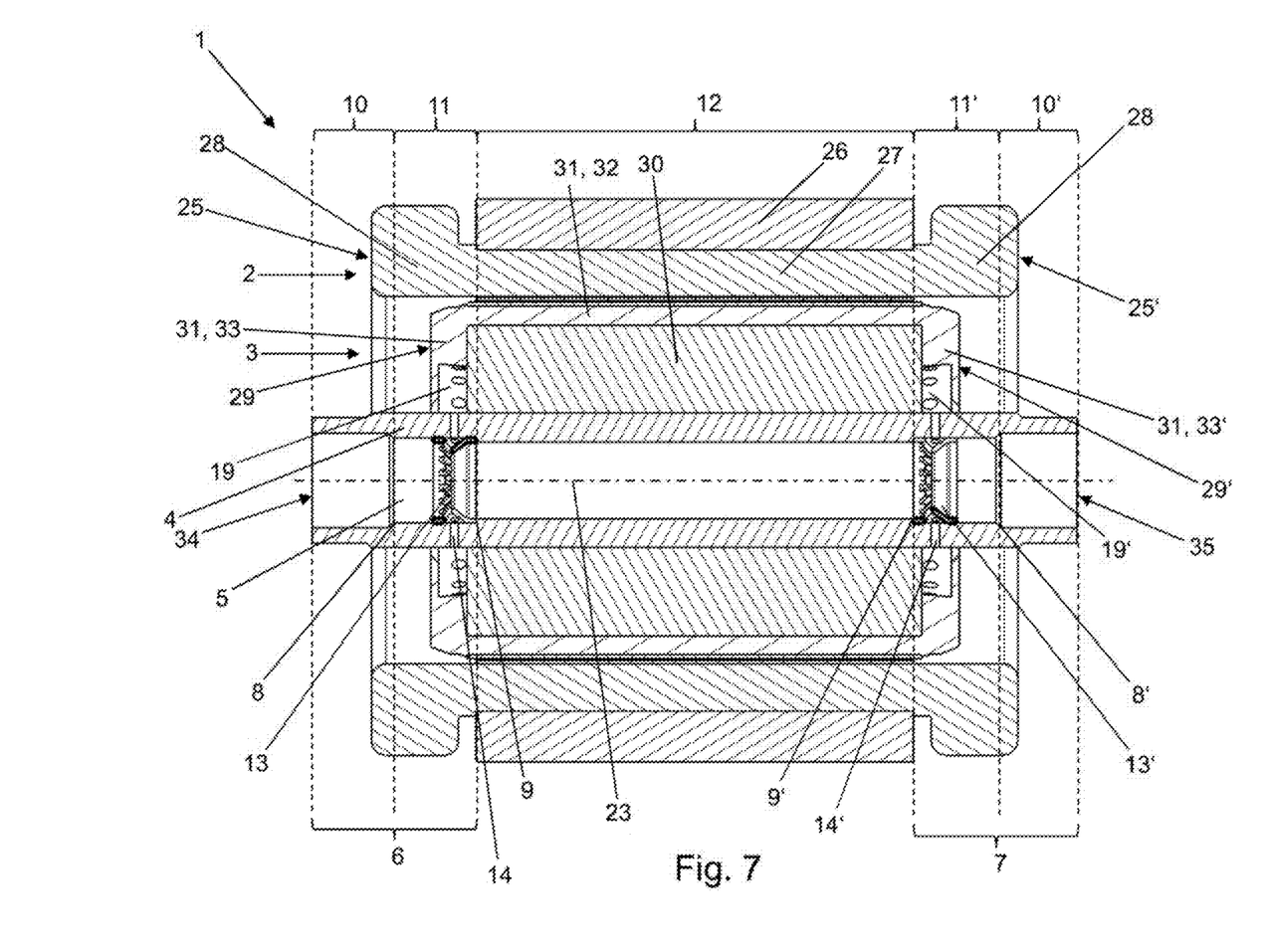
FIG. 7 shows a sectional view of an electrical machine comprising an attachment element which is integrally formed with a short-circuiting ring.
Figure 8:
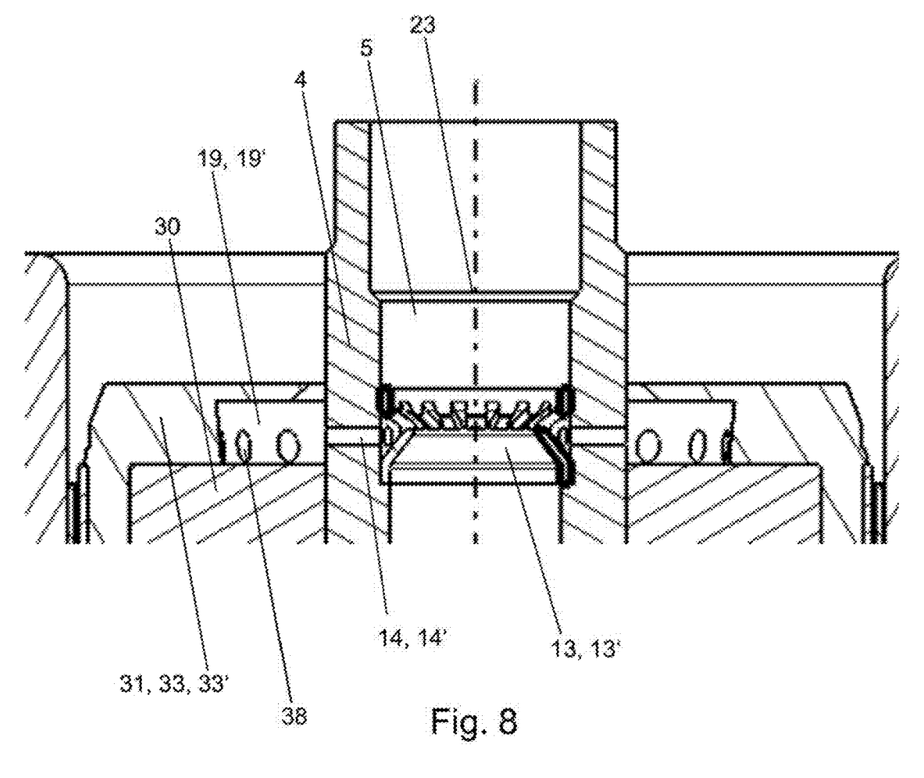
FIG. 8 shows an illustration of a detail of an electrical machine in accordance with FIG. 7.

The exemplary electrical machine 1, as illustrated in FIG. 1 to FIG. 3, in FIG. 5 and FIG. 7 and FIG. 8, is in the form of an asynchronous machine and comprises a stator 2 and a rotor 3. However, it is also conceivable to form the electrical machine 1 according to the invention as a synchronous machine.

The stator 2 is of substantially hollow-cylindrical shape. The stator 2 comprises a stator core 26, specifically a stator pack, and a plurality of stator windings 27. The stator windings 27 are arranged on the stator core 26 in slots which are provided for this purpose. The stator windings 27 have in each case axially protruding end windings 28 at the two stator end faces 25, 25' of the stator 2. (FIG. 2, FIG. 3 and FIG. 7)

The term "axial" corresponds to a direction along or parallel to a longitudinal axis 23 of the electrical machine 1.

The term "radial" corresponds to a direction normal to the longitudinal axis 23 of the electrical machine 1.

The rotor 3 is rotatably mounted within the stator 2 and comprises a rotor core 30, specifically a rotor pack, a rotor cage 31 and a rotor shaft 4. The rotor cage 31 of the rotor 3 has a plurality of conductor bars 32 which, at their ends, are electrically connected via short-circuiting rings 33 at the two rotor end faces 29, 29'. (FIG. 2, FIG. 3, FIG. 7)

The rotor shaft 4 of the rotor 3 of the electrical machine 1 is in the form of a hollow shaft and accordingly has a central hollow space 5. The hollow space 5 in the rotor shaft 4 extends axially over the entire length of the rotor shaft 4. The hollow space 5 in the rotor shaft 4 is designed to guide a cooling medium, that is to say the rotor shaft 4 is designed such that the cooling medium can flow through it. (FIG. 2, FIG. 3, FIG. 7)

The rotor shaft 4 has two projections in each case at a first end section 6 and at a second end section 7, specifically in each case a first projection 8, 8' and a second projection 9, 9'. Owing to the projections 8, 8', 9, 9', the rotor shaft 4 is formed with three rotor shaft sections, specifically with a first rotor shaft section 10, 10', a second rotor shaft section 11, 11' and a third rotor shaft section 12, with respectively different diameters. (FIG. 2, FIG. 3, FIG. 7)

The diameter of the rotor shaft 4 in the region of the first rotor shaft section 10, 10' is greater than the diameter of the rotor shaft 4 in the region of the second rotor shaft section 11, 11', and the diameter of the rotor shaft 4 in the region of the second rotor shaft section 11, 11' is greater than the diameter of the rotor shaft 4 in the region of the third rotor shaft section 12. (FIG. 2, FIG. 3, FIG. 7)

With reference to FIG. 2, FIG. 3 or FIG. 7 as viewed from left to right, the rotor shaft 4 is therefore divided into a first rotor shaft section 10, a second rotor shaft section 11, a central third rotor shaft section 12, a further second rotor shaft section 11' and a further first rotor shaft section 10'.

The rotor shaft 4 has an axial inlet opening 34 in the region of the first end section 6, more precisely in the region of the first rotor shaft section 10, and an axial outlet opening 35 in the region of the second end section 7, more precisely of the further first rotor shaft section 10'. (FIG. 2, FIG. 3, FIG. 7)

A flow element 13, 13' is in each case arranged in the hollow space 5 in the rotor shaft 4 in the region of the respective second rotor shaft section 11, 11'. (FIG. 3, FIG. 4a to FIG. 4c) Furthermore, a plurality of radial outlet openings 14, 14' are formed at a uniform distance from one another in the casing of the rotor shaft 4 in the region of the second rotor shaft section 11, 11'. The radial outlet opening 14, 14' serve to fluidically connect the hollow space 5 in the rotor shaft 4 to an outer region of the rotor shaft 4.

The flow elements 13, 13' are each formed in a sleeve-like manner and each have a central first opening 15 and also at least a plurality of second openings 16 which are formed in the casing of the respective flow element 13, 13'. The respective flow element 13, 13' is arranged in the hollow space 5 in the rotor shaft 4 such that the hollow space 5 in the rotor shaft 4 is fluidically connected to the respective radial outlet openings 14, 14' in the casing of the rotor shaft 4 and therefore to the outer region of the rotor shaft 4 via the second openings 16 in the respective flow element 13, 13'. (FIG. 3, FIG. 4a to FIG. 4c; FIG. 7)

The cooling medium can therefore enter the respective radial outlet openings 14, 14' through the second openings 16 in the casing of the respective flow element 13, 13', and form the secondary volume flow.

Figure 4A:
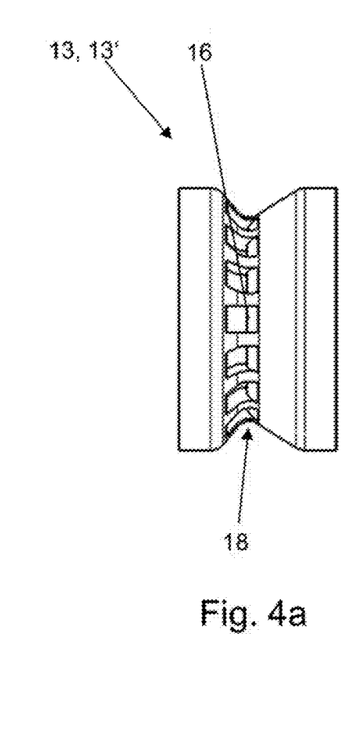
FIG. 4a shows a sectional view of a flow element.
Figure 4B:
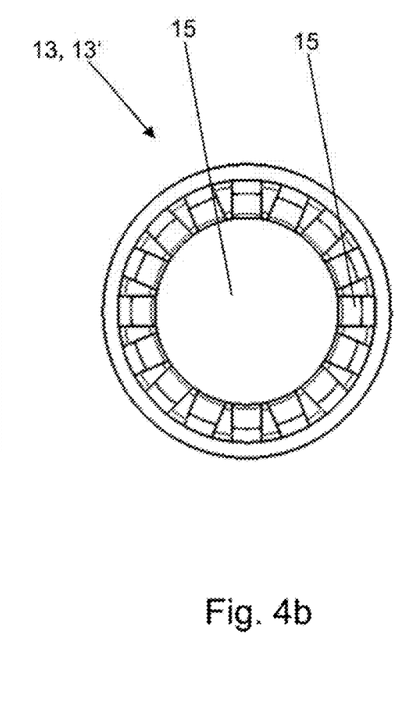
FIG. 4b shows a plan view of a flow element.
Figure 4C:
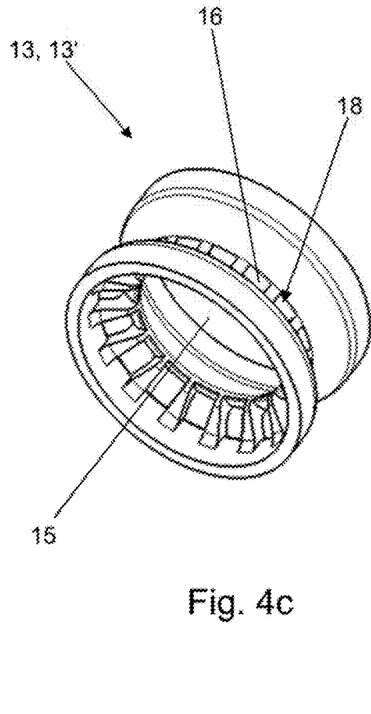
FIG. 4c shows a perspective view of a flow element.

The two sleeve-like flow elements 13, 13' each have a narrow point 18, wherein the second openings 16 in the respective flow element 13, 13' are formed in the region of the narrow point 18 of the respective flow element 13, 13'. (FIG. 4a to FIG. 4c)

Owing to the design of the electrical machine 1, the cooling medium which is guided through the hollow space 5 in the rotor shaft 4 can be guided in a targeted manner in a simple way, wherein partial volume flows of cooling medium, specifically a main volume flow 36 and a plurality of secondary volume flows 37, 37', the number of which corresponds to the number of radial outlet openings 14, 14', are produced. FIG. 2 and FIG. 3 schematically indicate the main volume flow 36 and the secondary volume flows 37, 37' using arrows.

The main volume flow 36 leads from the inlet opening 34 in the rotor shaft 4, axially through the hollow space 5 in the rotor shaft 4, to the outlet opening 35 of the rotor shaft 4. The main volume flow 36 therefore substantially takes over dissipation of heat from the rotor 3 of the electrical machine 1. (FIG. 2, FIG. 3)

The secondary volume flows 37, 37' pass out of the hollow space 5 in the rotor shaft 4 from the respective radial outlet openings 14, 14' in the casing of the rotor shaft 4. (FIG. 2, FIG. 3)

The outlet velocity of the secondary volume flows 37, 37' from the radial outlet openings 14, 14' depends on the system pressure within the hollow space 5 in the rotor shaft 4 and therefore of the main volume flow 36. However, owing to the arrangement of the respective flow element 13, 13' in the respective region of the second rotor shaft section 11, 11', adequate secondary volume flows 37, 37' can also be formed in pressureless systems.

If the respective flow element 13, 13' in the respective region of the second rotor shaft section 11, 11' were dispensed with, the quantity/velocity of the secondary volume flows 37, 37' in the case of an increasing throughflow rate of cooling medium at the inlet opening 34 would decrease considerably on account of turbulence phenomena occurring at the division points of the main volume flow 36 and secondary volume flows 37, 37'. Conversely, an opposite effect would be observed in the case of a low throughflow rate of cooling medium—the quantity of secondary volume flows 37, 37' would increase, and this would considerably reduce the cooling efficiency of the main volume flow 36.

The proportion of the respective secondary volume flows 37, 37' can be set by the width of the second openings 16 in the casing of the respective flow element 13, 13'. The larger the second openings 16 are designed to be, the larger the respective secondary volume flows 37, 37'—conversely, the secondary volume flows 37, 37' are smaller the smaller the second openings 16 are designed to be. (FIG. 4a to FIG. 4c)

Furthermore, the ratio of main volume flow 36 to secondary volume flows 37, 37' can be set by means of the diameter of the narrow point 18 of the respective flow element 13, 13', wherein the velocity of the secondary volume flows 37, 37' is also determined. (FIG. 4a to FIG. 4c)

Although the throughflow rate at the inlet opening 34 of the rotor shaft 4 is important for the quantity and/or the velocity of the main volume flow 36 and of the respective secondary volume flows 37, 37', the ratio between the flows, specifically the main volume flow 36 and the respective secondary volume flows 37, 37', is far less sensitive to changes in the throughflow rate at the inlet opening 34 in the rotor shaft 4 owing to the insertion of the respective flow element 13, 13' in the hollow space 5 in the rotor shaft 4. If the throughflow rate is now increased, fewer turbulence phenomena are produced at the respective division points of the main volume flow 36 and the respective secondary volume flows, and the respective secondary volume flows 37, 37' can be diverted more accurately. A reduction in the throughflow rate at the inlet opening 34 in the rotor shaft 4 does not have a disadvantageous effect on the main volume flow 36 on account of the division ratios between the main volume flow 36 and the secondary volume flows 37, 37' remaining constant.

Therefore, the cooling medium velocity of the main volume flow 36 and of the secondary volume flows 37, 37' can be influenced in a targeted manner owing to the arrangement of the respective flow elements 23, 23' in the region of the respective second rotor shaft section 11, 11'.

The electrical machine 1 further has two attachment elements 19, 19'. (FIG. 1 to FIG. 3 and FIG. 5 to FIG. 8)

An attachment element 19 is arranged fixed to the rotor shaft 4 in the region in the region of the first end section 6 of the rotor shaft 4. The further attachment element 19' is arranged fixed to the rotor shaft 4 in the region of the second end section 7 of the rotor shaft 4. (FIG. 2, FIG. 3, FIG. 5, FIG. 7 and FIG. 8)

The attachment elements 19, 19' are each designed in such a way that cooling medium passing out of the hollow space 5 in the rotor shaft 4 via the respective radial outlet openings 14, 14' cooling medium which passes out at the respective end sections 6, 7 of the rotor shaft 4 can be routed over the respective rotor end face 29, 29' and the respective stator end face 25, 25'.

Figure 6:
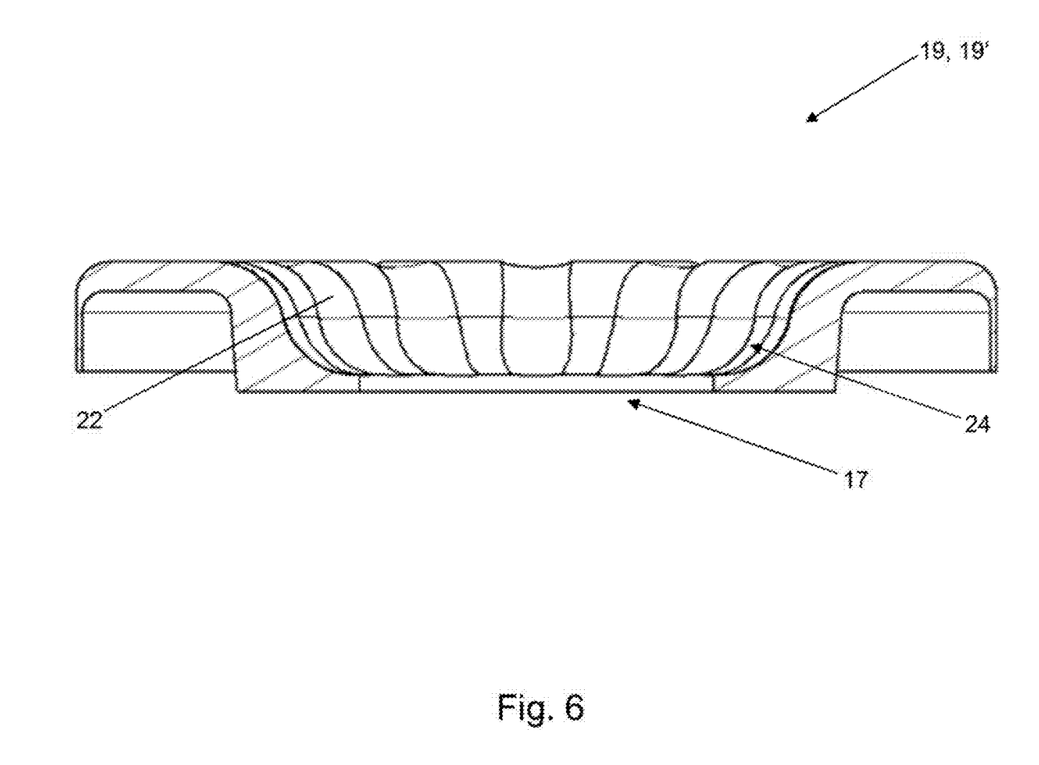
FIG. 6 shows a cross-sectional view of an attachment element.

The respective attachment element 19, 19' is formed in a substantially circular manner with a central third opening 17. (FIG. 5, FIG. 6)

The attachment elements 19, 19' are each fastened to the rotor shaft 4 via the central third opening 17.

The respective attachment elements 19, 19' have a step-like cross section. Furthermore, radially extending tracks 22 are formed starting from the central third opening 17 in the respective attachment element 19, 19'. The tracks 22 are formed at a uniform distance from one another with respect to the circumference of the respective attachment element 19, 19'. A cooling medium collecting section 24 is formed in the region of the respective radial outlet openings 14, 14' owing to the step-like design of the respective attachment element 19, 19'. Cooling medium passing out of the hollow space 5 in the rotor shaft 4 via the respective radial outlet openings 14, 14' is captured in the respective cooling medium collecting section 24 of the respective attachment element 19, 19' and, on account of the centrifugal force which is produced by rotation of the rotor shaft 4 during operation of the electrical machine 1, guided via the respective tracks 14 over the respective rotor end face 29, 29' and the respective stator end face 25, 25'. In this way, firstly the two short-circuiting rings 33, 33' at the two rotor end faces 29, 29' of the rotor 3 and the end windings 28 of the stator windings 27 at the two stator end faces 25, 25' of the stator 2 are efficiently cooled. Therefore, a targeted cooling medium flow over the respective rotor end face 29, 29' and the respective stator end face 25, 25' is rendered possible owing to the two attachment elements 19, 19'. (FIG. 1 to FIG. 3 and FIG. 5 to FIG. 8)

In addition, in particular, the rotor core 30 of the rotor 3 is cooled owing to the cooling medium being guided through the rotor shaft 4 which is in the form of a hollow shaft.

In the first variant embodiment of the electrical machine 1 illustrated in FIG. 1 to FIG. 3 and FIG. 5, the attachment elements 19, 19' are each fastened to the rotor shaft 4 as separate components.

In the second variant embodiment of the electrical machine 1 illustrated in FIG. 7 and FIG. 8, the attachment elements 19, 19' are each integrally formed with the respective short-circuiting ring 33, 33' of the electrical machine 1. Here, the cooling medium passes out via the respective radial outlet openings 14, 14' in the casing of the rotor shaft 4 and is collected in the cooling medium collecting section 24, which is in the form of a hollow space, formed by the respective short-circuiting ring 33, 33' and the rotor core 30, here, and transported further, through bores 38 in the respective short-circuiting ring 33, 33', in the direction of the respective stator end face 25, 25' where the cooling medium can be freely distributed over all of the end windings 28 of the stator 2 and therefore implements improved heat dissipation at the end windings 28 at the respective stator end face 25, 25'. (FIG. 7, FIG. 8)

LIST OF REFERENCE SYMBOLS

1 Electrical machine
2 Stator
3 Rotor
4 Rotor shaft
5 Hollow space
6 First end section
7 Second end section
8, 8' First projection
9, 9' Second projection
10, 10' First rotor shaft section
11, 11' Second rotor shaft section
12 Third rotor shaft section
13, 13' Flow element
14, 14' Radial outlet opening
15 First opening
16 Second opening
17 Third opening
18 Narrow point
19 Attachment element
22 Track
23 Longitudinal axis
24 Cooling medium collecting section
25, 25' Stator end face
26 Stator core
27 Stator winding
28 End winding
29, 29' Rotor end face
30 Rotor core
31 Rotor cage
32 Conductor bar
33, 33' Short-circuiting ring
34 Inlet opening
35 Outlet opening
36 Main volume flow
37, 37' Secondary volume flow
38 Bore

The invention claimed is:

1. An electrical machine comprising a stator and a rotor, wherein the rotor is rotatably mounted about an axis within the stator and has a rotor shaft which is designed as a hollow shaft and by means of which a hollow space is formed, the hollow space being provided for receiving a cooling medium, wherein an inner surface of at least one end section of the rotor shaft has a first projection and a second projection extending radially inwardly to different extents than one another to a first rotor shaft section with a first diameter at the inner surface, a second rotor shaft section with a second diameter at the inner surface and a third rotor shaft section with a third diameter at the inner surface, wherein a flow element is arranged in the hollow space of the rotor shaft in the second rotor shaft section, and wherein at least one radial outlet opening is formed in the region of the second rotor shaft section, said radial outlet opening fluidically connecting the hollow space in the rotor shaft to an outer region of the rotor shaft, wherein the flow element is generally sleeve-shaped and extends between a pair of ends, wherein the flow element defines an axial first opening axially between the ends, at least one radial second opening being axially aligned with the radial outlet opening for transmitting fluid from the hollow space to the outer region of the rotor shaft, and wherein an inside wall of the flow element tapers radially inwardly to a narrow point extending annularly about the axis and located axially between the pair of ends for varying a main volume flow through the hollow space of the rotor shaft relative to a secondary volume flow through the at least one second opening.

2. The electrical machine as claimed in claim 1, wherein the electrical machine comprises at least one attachment element, wherein the attachment element is arranged on the rotor shaft in the region of the at least one end section of the rotor shaft in such a way that cooling medium which passes out of the hollow space in the rotor shaft via the radial outlet opening can be routed at least partially over a rotor end face and a stator end face of the stator.

3. The electrical machine as claimed in claim 2, wherein the attachment element is formed in a substantially circular manner with a central third opening and a plurality of radially running tracks and/or channels which are at a uniform distance from one another.

4. An electrical machine as set forth in claim 1 wherein the inside wall of the flow element includes two tapered portions each generally having a frustoconical shape tapering radially inwardly to the narrow point on axially opposing sides of the narrow point.

5. An electrical machine as set forth in claim 1 wherein the inside wall has a generally frustoconical shape where it tapers radially inwardly to the narrow point.

6. An electrical machine as set forth in claim 1 wherein the at least one second opening includes a plurality of second openings circumferentially spaced from one another around the flow element around substantially an entire circumference of the inside wall of the flow element.

7. An electrical machine, comprising:
a stator extending about an axis;
a rotor rotatably mounted within the stator along the axis and having a rotor shaft with an inner surface defining a hollow space for receiving a cooling medium;
at least one radial outlet opening defined in the rotor shaft, said radial outlet opening fluidically connecting the hollow space of the rotor shaft to an outer region of the rotor shaft;
a flow element located in the hollow space in the rotor shaft in axial alignment with the at least one radial outlet opening, the flow element extending axially between a pair of ends and defining a first opening extending axially between the pair of ends, and defining at least one second opening extending radially between the hollow space and the at least one radial outlet opening for directing fluid from the hollow space to the at least one radial outlet opening; and the flow element further defining a narrow point axially between the pair of ends and extending radially inward of the pair of ends and annularly about the axis for varying a main volume flow through the hollow space of the rotor shaft relative to a secondary volume flow through the at least one second opening.

8. The electrical machine as claimed in claim 7 wherein the rotor has at least one end section having a first rotor section having a first diameter along the inner surface, a second rotor section including a first projection extending radially inwardly beyond the inner surface in the first rotor section to define a second diameter along the inner surface, and a third rotor section including a second projection extending radially inwardly past the inner surface along the second rotor section to define a third diameter along the inner surface such that the first diameter is greater than the second diameter, and the second diameter is greater than the third diameter, and wherein the flow element is located axially against a shoulder defined at a meeting of the first projection and second projection.

9. The electrical machine as claimed in claim 7, wherein the rotor includes a rotor core and a rotor cage located about the rotor core and axially against ends of the rotor core, wherein an attachment element is positioned about the rotor shaft and axially against one of the ends of the rotor core and an end of the rotor cage and in axially spaced relationship with the at least one radial outlet opening, and wherein the attachment element slopes between the one of the ends of the rotor core and the end of the rotor cage such that cooling medium which passes out of the hollow space in the rotor shaft via the radial outlet opening is routed at least partially over the one of the ends of the rotor core, the end of the rotor cage and a stator end face of the stator.

10. An electrical machine as set forth in claim 7 wherein an inside wall of the flow element includes a pair of tapered portions each generally having a frustoconical shape tapering radially inwardly to the narrow point on axially opposing sides of the narrow point.

11. An electrical machine as set forth in claim 7 wherein an inside wall of the flow element has a generally frustoconical shape as it extends to the narrow point.

12. An electrical machine as set forth in claim 7 wherein the at least one second opening includes a plurality of second openings circumferentially spaced from one another around the flow element around substantially an entire circumference of an inside wall of the flow element.

13. An electrical machine, comprising:
a stator;
a rotor rotatably mounted within the stator and having a rotor shaft with an inner surface defining a hollow space for receiving a cooling medium;
the rotor extending between a pair of end sections each having a first rotor section having a first diameter along the inner surface, a second rotor section including a first projection extending radially inwardly beyond the inner surface in the first rotor section to define a second diameter along the inner surface, and a third rotor section including a second projection extending radially inwardly past the inner surface along the second rotor section to define a third diameter along the inner surface such that the first diameter is greater than the second diameter, and the second diameter is greater than the third diameter;
a pair of radial outlet opening each defined in the second rotor shaft section of one of the pair of end sections in a casing of the rotor shaft, each of said pair of radial outlet openings fluidically connecting the hollow space of the rotor shaft to an outer region of the rotor shaft;
a pair of flow elements each located in one of the pair of end sections in the hollow space in the second rotor shaft section in axial alignment with one of the pair of radial outlet openings and defining at least one second opening extending radially between the hollow space and the one of the pair of radial outlet opening for directing fluid from the hollow space to the one of the pair of radial outlet openings;
each of the pair of flow elements defining a narrow point axially between ends of the flow elements, the narrow point extending radially inwardly and annularly about the axis for varying a main volume flow through the hollow space of the rotor shaft relative to a secondary volume flow through the at least one second opening.

14. An electrical machine as set forth in claim 13 wherein a portion of an inside wall of each of the flow elements has a generally frustoconical shape and terminates at the narrow point.

15. An electrical machine as set forth in claim 13 wherein an inside wall of each of the flow elements includes a pair of tapered portions each generally having a frustoconical shape and tapering radially inwardly to the narrow point on axially opposing sides of the narrow point.

16. An electrical machine as set forth in claim 13 wherein the at least one second opening of each of the flow elements includes a plurality of second openings circumferentially spaced from one another around the flow element around substantially an entire circumference of the inside wall of the flow element.

* * * * *